United States Patent [19]

Brunelle

[11] 4,316,981

[45] Feb. 23, 1982

[54] POLYCARBONATE TRANSESTERIFICATION

[75] Inventor: Daniel J. Brunelle, Scotia, N.Y.

[73] Assignee: General Electric Company, Schenectady, N.Y.

[21] Appl. No.: 159,051

[22] Filed: Jun. 13, 1980

[51] Int. Cl.$^3$ .............................................. C08G 63/62
[52] U.S. Cl. ................................... 528/199; 528/196; 528/198; 528/203
[58] Field of Search ......................... 528/199, 198, 203

[56] References Cited

U.S. PATENT DOCUMENTS 3,153,008 10/1964 Fox ..................................... 528/202
4,217,438 8/1980 Brunelle et al. .................... 528/202

*Primary Examiner*—Harold D. Anderson
*Attorney, Agent, or Firm*—Peter A. Bielinski; James C. Davis, Jr.; Joseph T. Cohen

[57] ABSTRACT

An improved transesterification process wherein a bis-(ortho-nitroaryl)carbonate and a dihydric phenol are reacted to form a polycarbonate under transesterification reaction conditions, the improvement comprising the use of a hypernucleophilic base.

8 Claims, No Drawings

POLYCARBONATE TRANSESTERIFICATION

CROSS REFERENCE TO RELATED APPLICATIONS

This invention is related to U.S. patent applications Ser. No. 134,705 filed Mar. 27, 1980, and Ser. No. 143805 filed Apr. 23, 1980, all of Daniel Joseph Brunelle; and U.S. Pat. No. 4,217,438 Daniel Joseph Brunelle and William Edward Smith. The above applications are assigned to the assignee of this invention and all of their disclosures are incorporated herein in their entirety by reference.

BACKGROUND OF THE INVENTION

1. Field of the Invention

This invention relates to an improved transesterification process wherein a bis(ortho-nitroaryl)carbonate and a dihydric phenol are reacted to form a polycarbonate under transesterification reaction conditions, the improvement comprising the use of a hypernucleophilic base.

2. Description of the Prior Art

In general, polycarbonate transesterification prior art including The Encyclopedia of Polymer Science, Vol. 10 (1969), Chemistry and Physics of Polycarbonates, Polymer Reviews, H. Schnell, Vol. 9, John Wiley and Sons, Inc. (1964); "Polycarbonates", Christopher and Fox, Reinhold Corporation of New York (1962); among other publications, including numerous U.S. and foreign patents including Great Britain Pat. No. 1,079,822 issued to Bayer (1966), authored by Curtius, Ludwig, Bottenbruch and Schnell, report that generally effective transesterification reactions involving aromatic dihydroxy compounds with carbonic acid aromatic diesters can be carried out in the presence of basic catalysts in the formation of high molecular weight impact-resistant thermoplastic polycarbonates.

DESCRIPTION OF THE INVENTION

This invention embodies an improved transesterification process wherein a bis(ortho-nitroaryl)carbonate and a dihydric phenol are reacted to form a polycarbonate under transesterification reaction conditions, the improvement comprising the use of a hypernucleophilic base.

A "hypernucleophilic base" is defined herein as any nitrogen ring containing heterocyclic aromatic compound having at least one electron-releasing group directly bonded to a carbon atom associated with an aromatic ring structure. An aromatic heterocyclic ring compound is defined herein as any heterocyclic ring structure in which carbon and nitrogen atoms are joined alternatively by one or two pairs of shared electrons, i.e. heterocyclic compounds exhibiting a state of dynamic electron oscillation, sometimes referred to as resonance. The heterocyclic compounds can be monocyclic, polycyclic or fused polycyclic and can have two or more cyclic systems (monocyclic, polycyclic or fused polycyclic systems) which are directly joined to each other by single or double valence bonds, or by bi- or multivalent radicals. The heterocyclic rings can have any number of ring members, e.g. 3-10, or more, etc., and can have the electron-releasing group located at any reactive position on the ring. For example, in a six membered ring the electron-releasing group can be located at any ortho or para position, preferably para, relative to any of the ring nitrogen atoms. Presently preferred heterocyclic compounds are monocyclic systems having (a) 6 ring members, (b) 1-3 nitrogen ring members, (c) 3-5 carbon ring members, and (d) 1-3 electron-releasing ring substituents. Illustratively, but not limiting, the term "electron-releasing group" includes any well-known group, e.g. amine ($-NH_2$), secondary amine ($-NHR$), tertiary amine ($-NR_2$), hydroxy ($-OH$), alkoxy ($-OR$), alkanoate ($-OOCR$), etc., where R is a hydrocarbyl radical, preferably containing 1-10 carbon atoms. Illustrative of presently preferred hypernucleophilic bases are set out hereafter:

4-dimethylaminopyridine,
4-diethylamino pyridine,
4-pyrrolidinopyridine,
4-aminopyridine,
2-aminopyridine,
2-hydroxypyridine,
2-methoxypyridine,
4-methoxypyridine,
4-hydroxypyridine,
2-dimethylaminoimidazole,
2-methoxyimidazole,
2-mercaptoimidazole,
2-aminopyrimidine, and
aminoquinolines, etc.

The "bis(ortho-nitroaryl)carbonate" also commonly referred to as a carbonic acid aromatic diester of an orthonitrophenol is defined herein by the general formula:

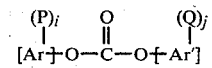

where at least a P or Q substituent is an ortho-positioned nitro, e.g. $-NO_2$ group, directly bonded to a ring carbon atom located adjacent to an oxy group of the carbonate, i and j represent whole numbers of at least 1 up to a maximum equivalent to the number of replaceable hydrogen atoms or other groups, e.g. $C_{1-4}$ alkyl, substituted for on the aromatic rings comprising Ar and Ar'. Optionally a P and/or Q substituent—subject to the proviso that at least one P or Q is a nitro group—can be an ortho positioned halogen, e.g. Cl, F, Br, or I or a trifluoromethyl group.

Presently preferred bis(ortho-nitroaryl)carbonates, including mixtures thereof, are of the formula:

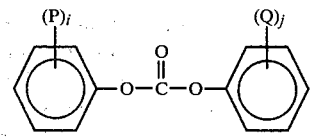

where independently at least a P or Q is an ortho-positioned nitro group, i and j are as defined above. Specific examples follow:
bis(o-nitrophenyl)carbonate,
o-nitrophenyl-o-chlorophenyl carbonate,
bis(2-nitro-4-methylphenyl)carbonate,
o-nitrophenyl o-trifluoromethylphenyl carbonate,
o-nitrophenyl-o-bromophenyl carbonate,
bis(2-nitro-3-methylphenyl)carbonate,
bis(2-nitro-4-ethylphenyl)carbonate,
bis(2-nitro-5-propylphenyl)carbonate, and
bis(2-nitro-6-butylphenyl)carbonate, etc.

Mixtures of bis(ortho-nitroaryl) and ortho-nitroaryl aryl carbonates can also be used in this process.

The "ortho-nitroaryl aryl carbonate"—which can also be referred to as a carbonic acid aromatic diester of an ortho-nitrophenol and a phenol—is defined herein by the general formula:

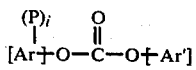

where P is as defined above, i represents a whole number of at least 1 up to a maximum equivalent to the number of replaceable hydrogen atoms or other groups, e.g. $C_{1-4}$ alkyl, substituted for on the aromatic ring comprising Ar, Ar' being an aromatic ring.

Presently preferred ortho-nitroaryl aryl carbonates including mixtures thereof, are of the formula:

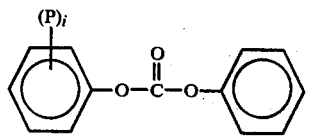

where independently P is an ortho-positioned nitro group, and i is as defined above. Specific examples follow:

o-nitrophenyl phenyl carbonate,
o-nitro-p-methylphenyl phenyl carbonate,
o-nitro-p-chlorophenyl phenyl carbonate,
o-nitro-o-trifluoromethylphenyl phenyl carbonate, and
o-nitro-p-butylphenyl phenyl carbonate, etc.

Sterically hindered "bis(ortho-nitroaryl)carbonates" or "ortho-nitroaryl aryl carbonates" having P and Q substituents positioned on all available ortho positions of the same aromatic ring are excluded as reactants in this process.

Any of the dihydric phenols, reaction parameters relative to amounts of reactants, etc., as well as reaction time, temperature and pressure described in U.S. Pat. No. 4,217,438 of D. J. Brunelle and W. E. Smith can be employed in this process. Accordingly, for brevity, their descriptions are incorporated herein in their entirety by reference.

Illustratively, "dihydric phenols" include dihydric or dihydroxy aromatic compounds—also incorporated herein by reference—defined by Fox's Formula II in U.S. Pat. No. 3,153,008, column 2, lines 23-72 and column 3, lines 1-42. Presently preferred dihydric phenols are of the formulas:

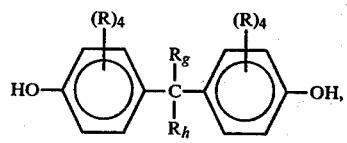

where independently each R is hydrogen, $C_{1-4}$ alkyl, methoxy, bromine and chlorine, $R_g$ and $R_h$ are hydrogen or a $C_{1-30}$ monovalent hydrocarbon or hydrocarbonoxy group, and

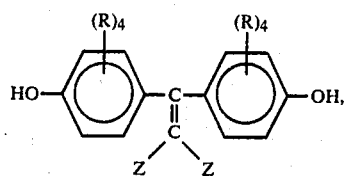

where independently each R is as defined above and each Z is hydrogen, chlorine or bromine, subject to the proviso that at least one Z is chlorine or bromine.

Specific examples follow:
4,4'-dihydroxy-diphenyl-1,1-butane,
4,4'-dihydroxy-diphenyl-2-chlorophenyl methane,
4,4'-dihydroxy-diphenyl-2,2-propane also known as "BPA" or bis(4-hydroxyphenyl)propane-2,2,
4,4'-dihydroxy-3-methoxy-diphenyl-2,2-propane,
4,4'-dihydroxy-3-isopropyl-diphenyl-2,2-propane,
4,4'-dihydroxy-diphenyl-2,2-nonane,
4,4'-dihydroxy-2,2',3,3',5,5',6,6'-octamethyl-diphenyl methane,
4,4'-dihydroxy-2,2'-dimethyl-5,5'-di-tert.-butyl-diphenyl methane,
4,4'-dihydroxy-3,3',5,5'-tetrachloro-diphenyl-2,2-propane,
4,4'-dihydroxy-3,3',5,5'-tetrabromo-diphenyl-2,2-propane, also referred to as "TBBPA" or bis(3,5-dibromo-4-hydroxyphenyl)propane-2,2,
1,1-dichloro-2,2-bis(4-hydroxyphenyl)ethylene also referred to as bisphenol-E "BPE" or bis(4-hydroxyphenyl)-2,2-dichloroethylene,
1,1-dibromo-2,2-bis(4-hydroxyphenyl)ethylene,
1,1-dichloro-2,2-bis(5-methyl-4-hydroxyphenyl)ethylene,
1,1-dibromo-2,2-bis(3,6-n-butyl-4-hydroxyphenyl)ethylene,
1,1-dichloro-2,2-bis(2-chloro-5-ethyl-4-hydroxyphenyl)ethylene,
1-bromo-2,2-bis(4-hydroxyphenyl)ethylene,
1,1-dichloro-2,2-bis(2-ethoxy-4-hydroxyphenyl)ethylene, and
1-bromo-2,2-bis(3,5-diphenylether-4-hydroxyphenyl)ethylene, etc.

The process can be carried out in the absence of any solvent, e.g. where the dihydric phenol or bis(ortho-nitroaryl)carbonate act as both reactant and solvent. Generally, preferably the process is carried out in the presence of nonpolar to medium polar solvents—subject to the proviso, more preferably, that the solvent employed be substantially free of protic solvents, especially protic solvents capable of strong hydrogen bonding.

In general, presently, among the most preferred solvents are the following:

Medium-polarity solvents such as methylene chloride, chloroform, 1,2-dichloroethane, chlorobenzene, anisol, bromobenzene, dichlorobenzenes, methyl formate, iodobenzene, acetone, acetophenone, etc., also including mixtures of any of the above. Although less preferred when contrasted with medium-polarity solvents, non- or low-polar solvents, such as hexane, 3-methylpentane, heptane, cyclohexane, methylcyclohexane, cyclohexane, isooctance, p-cymene, cumene, decalin, toluene, xylene benzene, diethylether, diphenyl ether, dioxane, thiophene, dimethylsulfide, ethyl acetate, tetrahydrofuran, etc., including mixtures of any of the above can be used.

Any amount of base can be employed. In general, effective mole ratios of base to dihydric phenols are within the range of from about $1\times10^8$ to 1 or even lower to about 10 to 1, or even higher, preferably from $1\times10^{-6}$ to 1 to about 1 to 1, and more preferably from $1\times10^{-5}$ to 1 to 1. Generally, mole ratios of at least $1\times10^{-3}$ to 1 enhances both the reaction rate and the yield of polycarbonate.

Any reaction pressure can be employed, e.g. atmosphere, subatmosphere or superatmospheric. Generally, however, the process is preferably carried out under a reaction pressure of approximately 1 atm. (~760 mm. Hg) during the initial phase of the reaction with a subsequent pressure reduction to values in the order of 1.0 to 0.1 mm Hg (vacuum), or even lower.

Any reaction temperature can be employed. Optimum reaction temperatures are generally within the range of from 0° C. or even lower, to 300° C. or even higher, and more often 25° C. to 100° C.

Any reaction time can be employed. Generally, optimum reaction time periods are from about 0.5 hours or even less to about 24 hours or even more.

BEST MODE

EXAMPLE I 1.414 g. of bis(4-hydroxyphenyl)propane-2,2 (5.00 mmol.), 1.52 g. of bis(o-nitrophenyl)carbonate (5.00 mmol.), 6.0 mg. of p-dimethylaminopyridine ($1\times10^{-2}$ mole percent based on BPA) were combined with 25 ml. of methylene chloride. After 60 minutes all the "BPA" was in solution. The reaction mixture was stirred overnight about 20 hours at room temperature, i.e. about 20°–23° C. The resulting 1.259 g. (99% yield) of polycarbonate product—precipitated using methanol—was characterized by GPC techniques using polystyrene standards in methylene chloride. A summary of the properties of the resulting polycarbonate is reported in Table I.

TABLE I

| Ex. No. | Dihydric Phenol Starting Material | BPA-Polycarbonate | | |
|---|---|---|---|---|
| | | Color[1] | MW$_w$[2] | I.V.[3] |
| I | bis(4-hydroxyphenyl)propane-2,2 | colorless | 58,000 | 0.55 |

FOOTNOTES:
[1] = color of product after methanol precipitation
[2] = GPC wt. avg. MW, rel. to polystyrene
[3] = IV measured in CHCl$_3$ at 25° C.

EXAMPLE II 1.414 g. of bis(4-hydroxyphenyl)-2,2-dichloroethylene (2.00 mmol.), 1.52 g. of bis(o-nitrophenyl)carbonate (2.00 mmol.), 6.0 mg. of p-dimethylaminopyridine ($1\times10^{-2}$ mole percent based on BPE) were combined with 25 ml. of methylene chloride. After 5 minutes all the "BPE" was in solution. The reaction mixture was stirred overnight about 20 hours at room temperature, i.e. about 20°–23° C. The resulting 0.595 g. (97% yield) of polycarbonate product—precipitated using methanol—was characterized by GPC techniques using polystyrene standards in methylene chloride. A summary of the properties of the resulting polycarbonate is reported in Table II.

TABLE II

| Example No. | Dihydric Phenol Starting Material | BPE-Polycarbonate | | |
|---|---|---|---|---|
| | | Color[1] | MW$_w$[2] | I.V.[3] |
| II. | bis(4-hydroxy)-2,2-dichloroethylene | colorless | 59,000 | 0.408 |

FOOTNOTES:
[1] = the color of the product after methanol precipitation
[2] = GPC wt. avg. MW, rel. to polystyrene
[3] = IV measured in CHCl$_3$ at 25° C.

EXAMPLE III 2.718 of bis(3,5-dibromo-4-hydroxyphenyl) propane 2,2 (5.00 mmol.), 1.52 g. of bis(o-nitro phenyl) carbonate (5.00 mmol. 6.0 mg. of p-dimethylaminopyridine ($1\times10^{-2}$ mole percent based on TBBPA were combined with 25 ml. of methylene chloride. After 10 minutes all the "TBBPA" was in solution. The reaction mixture was stirred overnight about 20 hours at room temperature, i.e. about 20°–23° C. The resulting 2.700 g. (95% yield) of polycarbonate product—precipitated using methanol—was characterized by GPC techniques using polystyrene standards in methylene chloride. A summary of the properties of the resulting polycarbonate is reported in Table III.

TABLE III

| Ex. No. | Dihydric Phenol Starting Material | TBBPA-Polycarbonate | | |
|---|---|---|---|---|
| | | Color[1] | MW$_w$[2] | I.V.[3] |
| III. | bis(3,5-dibromo-4-hydroxyphenyl)propane-2,2 | colorless | 9,000 | — |

FOOTNOTES:
[1] = the color of the product after methanol precipitation
[2] = GPC wt. avg. MW, rel. to polystyrene
[3] = IV measured in CHCl$_3$ at 25° C.

EXAMPLES IV and V

A series of transesterification reactions were carried out under equilibration reaction conditions, i.e. no removal of by-product ortho-nitrophenol via distillation.

11.414 g. of bis(4-hydroxyphenyl)propane-2,2 (50.0 mmol.) and 15.21 g. of bis(o-nitrophenyl)carbonate (50.0 mmol.) were heated in the presence of $1\times10^{-3}$ mole percent p-dimethylaminopyridine, i.e. "DMAP", for about 60 minutes at about 125° C. under equilibration reaction conditions.

A similar reaction identical in both amounts, type of reactants and process parameters—except that the temperature was 150° C. rather than 125° C. and 50 ml. of o-dichlorobenzene was used as a solvent—was carried out as noted above.

A summary of the process parameters as well as the properties of the resulting polycarbonates is set out in Table IV hereafter.

TABLE IV

| Example No. | Carbonate Substrate | Catalyst[4] | Solvent | BPA-Polycarbonate | | |
|---|---|---|---|---|---|---|
| | | | | Color[1] | MW$_w$[2] | I.V.[3] |
| IV | bis(o-nitrophenyl)-carbonate | "DMAP" | none | colorless | 23,000 | — |
| V | bis(o-nitrophenyl)- | " | o-dichlorobenzene | " | 36,000 | — |

TABLE IV-continued

| Example No. | Carbonate Substrate | Catalyst[4] | Solvent | BPA-Polycarbonate Color[1] | $MW_w{}^2$ | I.V.[3] |
|---|---|---|---|---|---|---|
| | carbonate | | | | | |

FOOTNOTES:
[1,2,3] = same as previous examples
[4] "DMAP" = p-dimethylaminopyridine weight average molecular weight of polycarbonate prior to hydrolysis, is set out in Table V hereafter:

TABLE V

| Example No. | Carbonate Starting Material | Mol Ratio NPC:NPPC | PA-Polycarbonate End Group Mol. Ratio phenoxy:o-nitrophenoxy | $MW_w{}^2$ |
|---|---|---|---|---|
| VI | NPC:NPPC[5] | 1.01:0 | no phenoxy | 45,000 |
| VII(a) | " " | 1.00:0.01 | 4:1 | 40,000 |
| VII(b) | " " | 0.99:0.02 | 6:1 | 36,000 |
| VII(c) | " " | 0.98:0.03 | 10:1 | 33,000 |
| VII(d) | " " | 0.97:0.04 | 30:1 | 25,000 |

FOOTNOTES:
[2] = same as previous examples
[5] = NPC = ortho-nitrophenyl carbonate NPPC = ortho-nitrophenyl phenylcarbonate

EXAMPLES VI and VII

A series of transesterification reactions were carried out using mixtures of bis(ortho-nitrophenyl)carbonate and ortho-nitrophenyl phenylcarbonate according to the following general procedure:

2.283 g. of bis(4-hydroxyphenyl)propane-2,2 (10.00 mmol.), 3.012 g. of bis(ortho-nitrophenyl)carbonate (9.90 mmol.), 51.8 mg. of ortho-nitrophenyl phenylcarbonate (0.20 mmol.), 12.2 mg. of p-dimethylaminopyridine (1 mole percent based on BPA) were combined with 25 milliliters of chlorobenzene. The reaction mixture was stirred for two hours at 75° C. The resulting polycarbonate—precipitated using methanol—was characterized by GPC techniques using polystyrene standards in methylene chloride.

The resulting polymer was hydrolyzed to monomer to determine via VPC the ratio of phenoxy to ortho-nitrophenoxy end groups associated with the polymer. The following general hydrolysis procedure was followed: a 250μ solution containing 5 g. of potassium hydroxide per 100 ml. of methanol was added to a 200 mg. sample of polycarbonate dissolved in 5 ml. of tetrahydrofuran. The 5% KOH/MeOH solution was added in amounts in excess of the stoichiometric requirements for complete hydrolysis of all end groups associated with the polycarbonate. After four hours, the resulting hydrolyzed polycarbonate solution was neutralized with 1 ml. of acetic acid. The relative proportion of phenoxy: o-nitrophenoxy based on the phenol:o-nitrophenol content of the hydrolyzed polycarbonate was determined by VPC techniques employing a 6-foot 10% Carbowax 20 M column using n-nonadecane as an internal standard.

A summary of the monocarbonate substrate mixtures of bis(ortho-nitrophenyl)carbonate: ortho-nitrophenyl phenylcarbonate (mole ratio basis) employed in the formation of polycarbonate, the VPC determined ratio of phenoxy:ortho-nitrophenoxy end groups derived from the hydrolyzed polycarbonates, as well as the As illustrated by the data of Examples VI and VII, the presence of an ortho-nitrophenyl phenylcarbonate substrate permits controlled end-capping transesterification reactions whereby controlled amounts of phenyl end groups (phenoxy end-capped polycarbonates) can be prepared. Routine experimentation by those of ordinary skill in the art will establish under various transesterification reaction conditions, i.e., the relative proportions of o-nitrophenyl phenylcarbonate to bis(nitrophenyl)carbonate, required to provide substantially approximately—up to an optimum of about 100% phenoxy end-capped polycarbonates.

COMPARATIVE DATA

For comparative data purposes a series of transesterification reactions were carried out under reaction conditions identical to Example IV, except for the use of other carbonate substrate-hypernucleophilic catalyst combinations. A summary of the process parameters as well as the properties of the resulting polycarbonates is set out in Table V hereafter:

TABLE V

| Ex. No. | Carbonate Substrate | Catalyst | BPA-Polycarbonate Color[1] | $MW_w{}^2$ | I.V.[3] |
|---|---|---|---|---|---|
| VIII | bis(o-chlorophenyl)-carbonate | DMAP | colorless | 900 | — |
| IX | diphenylcarbonate | DMAP | " | 400 | — |

FOOTNOTES:
[1,2,3] = same as previous examples

Other highly efficient substrate-catalyst combinations—which are the subject of previously cross-referenced Ser. No. 143,805—employed in transesterification reactions like Example IV, except for the type of catalyst and optionally a phase transfer agent, are included for comparative purposes. Phase transfer agent when employed was present in an amount—mole percent basis—equivalent to the amount of base used. The reactants were heated for about 60 minutes at about 150° C. under equilibration reaction conditions.

TABLE VI

| Example No. | Carbonate Substrate | Catalyst | Phase Transfer[4] Agent | Color[1] | $MW_w{}^2$ | I.V.[3] |
|---|---|---|---|---|---|---|
| X | bis(o-nitrophenyl)- | $C_6H_5ONa$ | $Bu_4PBr$ | colorless | 8,400 | 0.143 |

TABLE VI-continued

| Example No. | Carbonate Substrate | Catalyst | Phase Transfer[4] Agent | Color[1] | $MW_w$[2] | I.V.[3] |
|---|---|---|---|---|---|---|
| XI | bis(o-nitrophenyl)carbonate | " | 18-Crown-6 | " | 7,400 | 0.139 |
| XII | bis(o-nitrophenyl)carbonate | " | Bu$_4$NBr | " | 7,100 | 0.129 |
| XIII | bis(o-chlorophenyl)carbonate | " | Bu$_4$PBr | " | 1,700 | .036 |
| XIV | bis(o-chlorophenyl)carbonate | C$_6$H$_5$ONa | none | " | 900 | — |
| XV | diphenylcarbonate | " | Bu$_4$PBr | " | 400 | — |
| XVI | " | C$_6$H$_5$ONa | none | " | 330 | — |

FOOTNOTES:
[1,2,3] = same as previous examples
[4] = Bu$_4$PBr : tetrabutyl phosphonium bromide  Bu$_4$NBr : tetrabutyl ammonium bromide In general, the use of a hypernucleophilic bases in combination with bis(o-nitroaryl)carbonate substrates in transesterification processes provides advantages not associated with other carbonate substrate-base combinations, e.g., bis(o-chlorophenyl)carbonate or diphenylcarbonate and other bases. The transesterification process described herein provides the following advantages—compared with the process described in the previously referred to cross-referenced patent applications—(1) improved transesterification reaction rates at lower temperatures, (2) equal or reduced amounts of carbonate substrate since only stoichiometric amounts or amounts slightly in excess, e.g., 0 to 1%, are required for complete conversion of all dihydric phenol to polycarbonate, and (3) equal or reduced quantitis of catalyst while maintaining the improved reaction rate, temperature and pressure transesterification reaction conditions described here. The use of mixtures of bis(o-nitroaryl)carbonates and o-nitroaryl arylcarbonates provides in addition to the above advantages controlled aryl endcapping of the resulting polycarbonate.

Illustratively the transesterified polycarbonate end products derived from the process of this patent, preferably, exhibit intrinsic viscosities of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl./g. Especially useful polycarbonates generally have an intrinsic viscosity within the range of from about 0.38 to about 0.7 dl./g. Preferably, the polycarbonates have a number average molecular weight of at least about 5,000, and more preferably from about 10,000 to about 50,000. Polycarbonates of such molecular weight characteristics process easily inbetween about 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

I claim:

1. An improved transesterification process wherein a bis(ortho-nitroaryl)carbonate and a dihydric phenol are reacted to form a high molecular weight polycarbonate under transesterification reaction conditions, the improvement comprising the use of a hypernucleophilic base which comprises a nitrogen ring containing heterocyclic aromatic compound having at least one electron releasing group directly bonded to a carbon atom in the aromatic ring structure of the aromatic compound, wherein the mole ratio of said base to said dihydric phenol is within the range of from $1 \times 10^{-8}$:1 to 1:1.

2. The claim 1 process where the dihydric phenol is of the formula

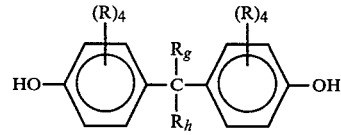

where independently each R is hydrogen, C$_{1-4}$ alkyl, methoxy, bromine or chlorine, R$_g$ and R$_h$ are hydrogen or a C$_{1-30}$ monovalent hydrocarbon or hydrocarbonoxy group, or of the formula:

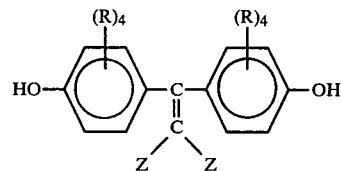

where independently each R is as defined previously and each Z is hydrogen, chlorine or bromine, subject to the proviso that at least one Z is chlorine or bromine.

3. The claim 1 process further comprising transesterification reaction conditions at temperatures less than about 300° C.

4. The claim 1 process where the carbonate is bis(o-nitrophenyl)carbonate.

5. The claim 2 process where the dihydric phenol is bis(4-hydroxyphenyl)propane-2,2.

6. An improved transesterification process wherein a bis(ortho-nitrophenyl)carbonate and a bis(4-hydroxyphenyl)propane-2,2 are reacted to form a high molecular weight polycarbonate under transesterification conditions, the improvement comprising the use of a hypernucleophilic base which comprises a nitrogen ring containing heterocyclic aromatic compound having at least one electron-releasing group directly bonded to a carbon atom in the aromatic ring structure of the aromatic compound, wherein the mole ratio of said base to said bis-(4-hydroxyphenyl)propane-2,2 is within the range of from $1 \times 10^{-3}$:1 to 1:1.

7. The claim 6 process where the base is 4-dimethylamino pyridine.

8. The claim 7 process where the reactants include an ortho-nitrophenyl phenylcarbonate.

* * * * *